US008614753B2

(12) United States Patent
Ko et al.

(10) Patent No.: US 8,614,753 B2
(45) Date of Patent: Dec. 24, 2013

(54) METHOD AND APPARATUS FOR GENERATING IMAGE FILE HAVING OBJECT INFORMATION

(75) Inventors: Chang-seog Ko, Hwaseong-si (KR); Hyun-cheol Park, Suwon-si (KR); Young-sun Kim, Suwon-si (KR); Yoo-jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1472 days.

(21) Appl. No.: 12/029,754

(22) Filed: Feb. 12, 2008

(65) Prior Publication Data

US 2009/0009626 A1    Jan. 8, 2009

(30) Foreign Application Priority Data

Jul. 2, 2007    (KR) .................. 10-2007-0066189

(51) Int. Cl.
*H04N 5/76*    (2006.01)
(52) U.S. Cl.
USPC .................... 348/231.3; 348/231.5
(58) Field of Classification Search
USPC .......................... 348/241.3–241.6
See application file for complete search history.

(56) References Cited

U.S. PATENT DOCUMENTS

| 6,992,587 | B2 |  | 1/2006 | Maeda et al. |
| 7,362,219 | B2 |  | 4/2008 | Nogami et al. |
| 7,373,109 | B2 | * | 5/2008 | Pohja et al. .................. 455/41.2 |
| 7,456,871 | B2 | * | 11/2008 | Iida et al. .................... 348/231.5 |
| 7,528,868 | B2 | * | 5/2009 | Perotti et al. ............... 348/231.3 |
| 2002/0101519 | A1 | * | 8/2002 | Myers .......................... 348/232 |
| 2003/0081126 | A1 | * | 5/2003 | Seaman et al. ............. 348/207.1 |
| 2004/0075752 | A1 | * | 4/2004 | Valleriano et al. ......... 348/231.3 |
| 2004/0125208 | A1 | * | 7/2004 | Malone et al. ............. 348/207.1 |
| 2004/0174443 | A1 | * | 9/2004 | Simske ....................... 348/231.3 |
| 2005/0018057 | A1 | * | 1/2005 | Bronstein et al. ............. 348/239 |
| 2005/0096084 | A1 |  | 5/2005 | Pohja et al. |
| 2006/0158533 | A1 | * | 7/2006 | Brahmbhatt et al. ...... 348/231.2 |
| 2006/0187316 | A1 | * | 8/2006 | Teramoto et al. .......... 348/231.3 |
| 2006/0197838 | A1 | * | 9/2006 | Yamakita ...................... 348/169 |
| 2007/0096909 | A1 | * | 5/2007 | Lally ........................ 340/572.1 |
| 2007/0103566 | A1 | * | 5/2007 | Aerrabotu et al. ......... 348/231.3 |

FOREIGN PATENT DOCUMENTS

| CN | 1468019 A | 1/2004 |
| JP | 2006-40059 A | 2/2006 |
| KR | 10-2004-0076624 A | 9/2004 |

OTHER PUBLICATIONS

Communication dated Jun. 2, 2011 from the State Intellectual Property Office of P.R. China in a counterpart application No. 200810083259.1.
Communication, dated Oct. 21, 2013, issued by the Korean Intellectual Property Office in counterpart Korean Patent Application No. 10-2007-0066189.

* cited by examiner

*Primary Examiner* — James Hannett
*Assistant Examiner* — Dwight C Tejano
(74) *Attorney, Agent, or Firm* — Sughrue Mion, PLLC

(57) ABSTRACT

Provided are a method and an apparatus for generating an image file having information about an object. The method of generating the image file having the object information includes the operations of generating image data by taking a picture of the object; receiving the object information from the object through a network; and storing the object information in an image file together with the image data. Accordingly, when a photographing apparatus capable of perform wireless communications generates image data by taking a picture of an object having a wireless communication module, object information is received from the object through wireless communications and is stored together with image data.

32 Claims, 7 Drawing Sheets

METHOD AND APPARATUS FOR GENERATING IMAGE FILE HAVING OBJECT INFORMATION

CROSS-REFERENCE TO RELATED PATENT APPLICATION

This application claims priority from Korean Patent Application No. 10-2007-0066189 filed on Jul. 2, 2007, in the Korean Intellectual Property Office, the disclosure of which is incorporated herein in its entirety by reference.

BACKGROUND OF THE INVENTION

1. Field of the Invention

The present invention relates to generation of an image file, and more particularly, to generating an image file having object information

2. Description of the Related Art

Wireless communication devices have the advantage of not being restricted by the length of connection lines and allow the users to enjoy a large range of services while on the move. Wireless communications can be generally divided into infrared communications based on the Infrared Data Association (IrDA) standard and Radio Frequency (RF) communications. Although infrared communication devices have a simple structure and low power consumption, they can only be performed in a relatively small area where the devices face each other. In addition, infrared communications are not possible when an obstacle exists between two infrared communications devices. However, RF communications can be performed regardless of the positioning direction of RF devices, and are not affected by obstacles. RF wireless communication methods include Wireless Local Area Network (WLAN) methods, Bluetooth methods, Zigbee methods, Wireless Broadband (WiBro) methods, and Radio Frequency Identification (RFID) methods in which objects can be recognized based on unique IDs of the objects. RFID method is a non-touch recognition method used to wirelessly transmit and process information about various objects and their surroundings using devices called RFID tags that are incorporated into the objects.

If a user having an RFID reader is within a predetermined range from an object having an RFID tag, the user can know the information stored in the RFID tag since the RFID reader wirelessly receives an RF signal transmitted from the RFID tag. However, if the user moves outside the predetermined range of the object having the RFID tag, the user cannot know the information stored in the RFID tag. In addition, if only simple information about an object is stored in the RFID tag attached to the object, it is difficult for a user to obtain detailed information about the object having the RFID tag.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide a method and apparatus for generating an image file of an object, in which, when a photographing apparatus capable of perform wireless communications generates image data by taking a picture of an object having a wireless communication module, object information is received from the object through wireless communications and is stored together with image data.

Aspects of the present invention also provide a method and apparatus for generating an image file, in which when a camera generates image data by taking a picture of an object, a location of the object is converted into a location on an image by using location information about the camera and object, and information indicating the converted location on the image is stored in the image file.

Aspects of the present invention also provide a method and apparatus for outputting an image file, in which when image data generated by taking a picture of an object is output, information about the object is also output.

Aspects of the present invention also provide a method and apparatus for outputting an image file, in which when image data generated by taking a picture of an object is output, the information about the object is also output to the location of the object on the image.

According to an aspect of the present invention, there is provided a method of generating an image file including object information about an object, the method performed in a user terminal and including the operations of generating image data by taking a picture of the object; receiving the object information from the object through a network; and storing the object information in an image file together with the image data.

The object may have a Radio Frequency Identification (RFID) tag and the user terminal has an RFID reader, wherein the receiving of the object information comprises receiving the object information included in the RFID tag using a radio frequency.

The method may further include the operations of converting location information of the object into location information of the object on a screen by using location information of the user terminal and location information of the object; and adding the converted location information of the object on the screen to the object information and storing a result of the addition in the image file.

The method may further include the operation of calculating the location information of the user terminal, wherein the operation of calculating the location information of the user terminal includes the operations of receiving a Global Positioning System (GPS) signal from a satellite; and calculating the location information of the user terminal by using the received GPS signal.

The method may further include the operation of calculating the location information of the user terminal, wherein the operation of calculating the location information of the user terminal includes the operations of receiving a wireless signal from a base station; and calculating the location information of the user terminal by using the wireless signal.

The network may be a short-distance wireless network using one of a Wireless Local Area Network (WLAN) method, a Bluetooth method, a Zigbee method, and a Wireless Broadband (WiBro) method.

According to another aspect of the present invention, there is provided a method of generating an image file including object information about an object, the method performed in a user terminal and including the operations of generating image data by taking a picture of the object; receiving object identification information from the object through a network; and storing the object identification information in the image file together with the image data.

The user terminal may be connected to an object information storage server through the network, or through another network, and the method may further include the operations of transmitting the object identification information to the object information storage server; receiving the object information about the object from the object information storage server; and storing the received object information in the image file together with the image data.

According to another aspect of the present invention, there is provided a method of outputting an image file including object information about an object, the method performed in a user terminal and includes the operations of extracting image data generated by taking a picture of the object from the image file and outputting the image data; and extracting the object information received from the object from the image file and outputting the object information.

The object information may be extracted from a metadata area of the image file.

The operation of outputting the object information may include the operation of outputting the object information to a location of the object on an image by using location information of the object that is stored in the image file.

According to another aspect of the present invention, there is provided a method of outputting an image file including object information about an object, the method performed in a user terminal and including the operations of extracting image data generated by taking a picture of the object from the image file and outputting the image data; extracting object identification information received from the object from the image file; searching for the object information from a database by using the object identification information; and outputting the object information extracted from the database.

According to another aspect of the present invention, there is provided a method of outputting an image file including object information about an object, the method performed in a user terminal which is connected to an object information storage server through a network, the method including the operations of outputting image data generated by taking a picture of the object; extracting object identification information received from the object; transmitting the object identification information to the object information storage server; receiving the object information from the object information storage server; and outputting the object information.

According to another aspect of the present invention, there is provided an apparatus which generates an image file including object information about an object, the apparatus including an image file processing unit which generates image data by taking a picture of the object, and stores information received from the object together with the image data so as to generate the image file; and a communication unit which receives the information from the object through a network.

According to another aspect of the present invention, there is provided an apparatus which outputs an image file having object information of an object, wherein the apparatus extracts image data generated by taking a picture of the object from the image file and outputs the image data, and extracts the object information received from the object from the image file and outputs the object information.

According to another aspect of the present invention, there is provided an apparatus which outputs an image file having object information of an object, wherein the apparatus extracts image data generated by taking a picture of the object from the image file and outputs the image data, extracts object identification information received from the object from the image file, searches for the object information from a database by using the object identification information, and outputs the object information extracted from the database.

According to another aspect of the present invention, there is provided an apparatus which outputs an image file having object information about an object by connecting to an object information storage server through a network, wherein the apparatus outputs image data generated by taking a picture of the object, extracts object identification information received from the object, transmits the object identification information to the object information storage server, receives the object information from the object information storage server, and outputs the object information.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
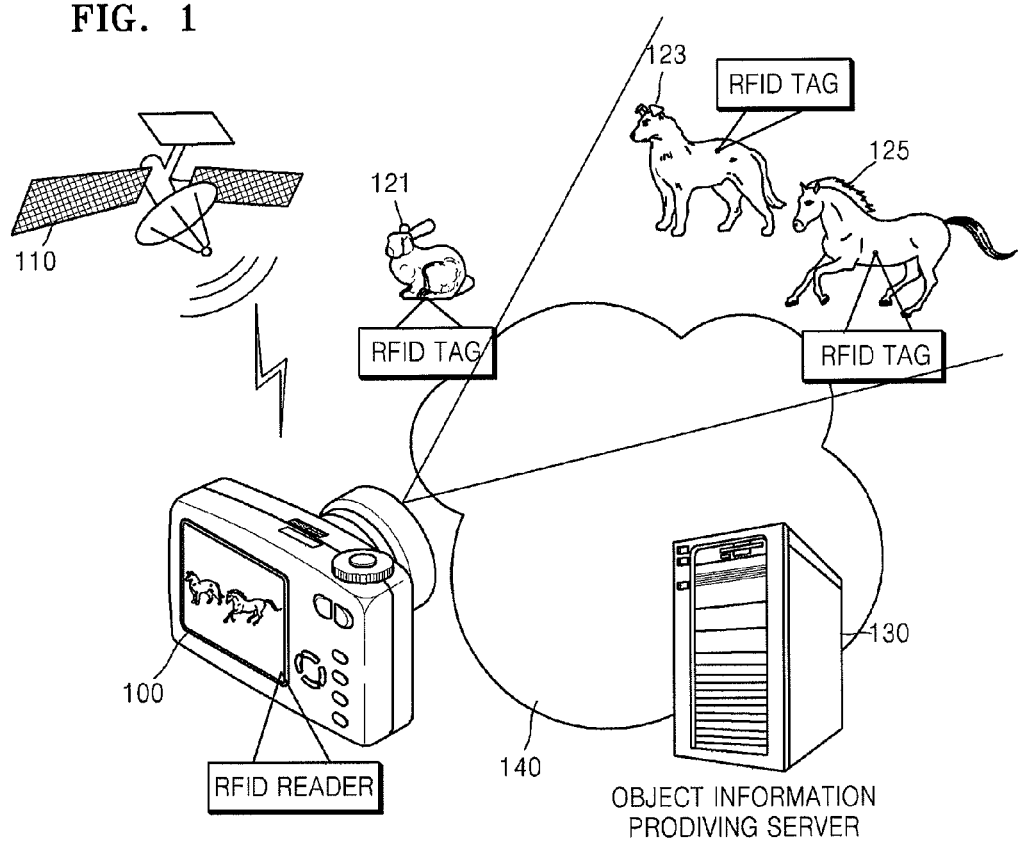
FIG. 1 illustrates a system for generating an image file for explaining an exemplary embodiment of the present invention.

FIG. 1 illustrates a system for generating an image file for explaining an exemplary embodiment of the present invention.

Referring to FIG. 1, the system includes a user terminal 100, a Global Positioning System (GPS) satellite 110, objects 121, 123, and 125 having wireless communication modules, an object information providing server 130, and a network 140. The user terminal 100 includes an electronic device which can generate image data and communicate with other devices. The user terminal 100 may be a camera including a communication module or a device having a camera function such as a Personal Digital Assistant (PDA), a Portable Multimedia Player (PMP), a cellular phone, navigation, or a laptop.

The objects 121, 123, and 125 are devices that can perform wireless communications with other devices by using wireless communication modules. As illustrated in FIG. 1, the objects 121, 123, and 125 are animals having Radio Frequency Identification (RFID) tags 305, 315, and 325, respectively, however, the present invention is not limited thereto. In other words, the objects 121, 123, and 125 may be electronic devices including wireless communication modules such as Bluetooth or Zigbee. For example, the objects 121, 123, and 125 may be PDAs, PMPs, cellular phones, navigation devices, or laptops, which are small in size, so light to be portable, and can perform wireless communications with other devices.

The object information providing server 130 stores information about the objects 121, 123, and 125. Examples of the object information providing server 130 include not only general search web sites but also professional web sites which only store information about the objects which may be wireless communications devices.

Through the network 140, the user terminal 100 is connected to the objects 121, 123, and 125, to which the wireless communications modules are attached, and to the object information providing server 130. More specifically, a network which connects the user terminal 100 to the object information providing server 130 may be a wireless network which is the same as or different from a wireless network which connects the user terminal 100 to the objects 121, 123, and 125, to which the wireless communications modules are attached. Alternatively, the network which connects the user terminal 100 to the object information providing server 130 may be a wired network which is separate from the wireless network which connects the user terminal 100 and the objects 121, 123, and 125.

According to an exemplary embodiment of the present invention, the user terminal 100 receives from each of the objects 121, 123, and 125 a unique identification number or information about each of the objects 121, 123, and 125. As in the exemplary embodiment of FIG. 1, when the objects 121, 123, and 125 includes RFID tags as the wireless communications modules, the user terminal 100 includes an RFID reader that receives RFID tag information from the objects 121, 123, and 125 and obtains an unique identification number or detailed information from the received RFID tag information. If the objects 121, 123, and 125 include Bluetooth or Zigbee as wireless communication modules instead of the RFID tags, the user terminal 100 should wirelessly communicate with the objects 121, 123, and 125 in order to obtain information about each of the objects 121, 123, and 125. The user terminal 100 may request the objects 121, 123, and 125 for wireless communications in order to obtain information about the objects 121, 123, and 125. The objects 121, 123, and 125 may transmit the identification number or information of the objects to the user terminal 100 through the wireless communications with the user terminal 100.

According to an exemplary embodiment of the present invention, the user terminal 100 needs to recognize the location of itself and locations of the objects 121, 123, and 125 having wireless communication modules. Examples of a method of recognizing the location of a user terminal itself include location recognition based on a base station and location recognition based on a GPS satellite, and a combination of these two location recognition methods. Although it is illustrated in FIG. 1 that the user terminal 100 receives a GPS signal from the GPS satellite 110 in order to obtain information about the location of the user terminal 100 itself, the present invention is not limited thereto. The user terminal 100 may recognize its location according to the aforementioned location recognition based on a base station or a location recognition method to be developed in the future. The user terminal 100 can receive a GPS signal at intervals of a predetermined time or receive a new GPS signal whenever the position of the terminal 100 changes, to thereby update information on the location thereof. The information on the location may include a latitude, a longitude, an altitude, a direction, etc.

The user terminal 100 needs to obtain location information about the objects 121, 123, and 125 to which wireless communication modules are attached. If the objects 121, 123, and 125 having the wireless communication modules include a location estimating unit to recognize the locations of the objects 121, 123, and 125 themselves on the basis of a GPS signal or a base station signal, the objects 121, 123, and 125 can recognize their locations. In this case, the user terminal 100 may receive location information about the objects 121, 123, and 125 from the objects 121, 123, and 125 to use the location information. If the objects 121, 123, and 125 having the wireless communication modules include no location estimating units, the user terminal 100 may focus on the objects 121, 123, and 125 and obtain location information about the focused objects 121, 123, and 125. In other words, the user terminal 100 focuses on the objects 121, 123, and 125 that are to be wirelessly communicated by using a viewfinder or a liquid crystal display screen, and obtains location information about the focused objects by using the location information about the user terminal 100 itself. The location information about the objects 121, 123, and 125 may be obtained in various methods in addition to the above-described methods. The user terminal 100 can convert the location information of the objects into information about locations of the objects on images to be displayed in the user terminal 100, by using the location information of the user terminal 100 and the location information of the objects. The user terminal 100 can store the converted information about locations of the objects in an image file on the object with the information of the object or a website address having detailed information about the objects 121, 123, and 125, which have been obtained from the RFID tags or the other wireless communication modules.

In the exemplary embodiment of the present invention, the user terminal 100 may generate image data by taking pictures of objects. The user captures a visual field that is seen on a viewfinder or a liquid crystal display screen included in the user terminal 100. The user terminal 100 may store information about the objects 123 and 125 which belong to the visual field, together with an image data. If the communication modules attached to the objects 121, 123, 125 are RFID tags and a small amount of data is stored in the RFID tags, the user terminal 100 may store the small amount of data, for example, unique identification information or a simple keyword about the objects, received from the RFID tags of the objects 121, 123, and 125, and at the same time, and transmit the small amount of data to the object information providing server 130 connected to the user terminal 100 through a network, to thereby request detailed information about the objects. In response to the request of the user terminal 100, the object information providing server 130 may extract the detailed information about the objects by using unique identification information or a simple keyword about the objects, and transmit the extracted detailed information to the user terminal 100. In some cases, the user terminal 100 may include database (not shown) in which information about objects are stored. In this case, the user terminal 100 may search for detailed information about objects in the database included therein. The user terminal 100 stores the extracted information about the objects in an image file, together with image data.

Figure 2:
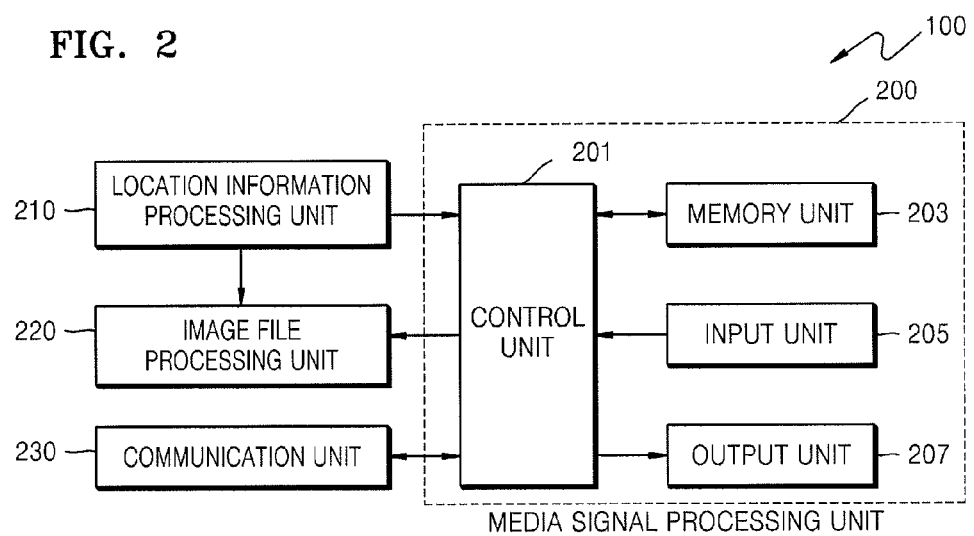
FIG. 2 is a layout of a user terminal according to an exemplary embodiment of the present invention.

FIG. 2 is a layout of the user terminal 100 illustrated in FIG. 1. Referring to FIG. 2, the user terminal 100 includes a media signal processing unit 200, a location information processing unit 210, an image file processing unit 220, and a communication unit 230. The media signal processing unit 200 performs various types of functions according to the type of user terminal 100. For example, if the user terminal 100 is a cellular phone, the media signal processing unit 200 can perform a wireless communication function, and if the user terminal 100 is a MPEG Audio Layer-3(MP3), the media signal processing unit 200 can reproduce an audio signal.

The media signal processing unit 200 includes a control unit 201, a memory unit 203, an input unit 205, and an output unit 207. The control unit 201 controls overall operations of the user terminal 100, and also controls an image file generating method according to the present invention to be performed. The control unit 201 includes an Arithmetic Logic Unit (ALU) for performing calculations, and a register for temporarily storing data and commands.

The memory unit 203 stores programs that are needed to perform media signal generation and the image file generation. Examples of the memory unit 203 include a high speed main memory, being a storage medium type such as a Random Access Memory (RAM) or Read Only Memory (ROM), a secondary memory being a long-term storage medium type such as a floppy disk, a hard disk, a tape, a CD-ROM, or a flash memory, and devices which store data by using electric, magnetic, optical, or other storage media.

The input unit 205 receives a command, a text, a number, or voice information from a user by using a physical transducer such as a keyboard, a mouse, a touch pad, a touch screen, or a microphone, and informs the control unit 201 of the reception of the command, text, number, or voice information. The output unit 207 outputs an overall status of the user terminal 100 or information input by the user via the input unit 205, through a screen or a speaker. The output unit 207 may include a display unit (not shown) for outputting a video signal among media signals, a speaker (not shown) for outputting an audio signal among the media signals, and an On Screen Display (OSD) processing unit (not shown) for generating, for example, a user terminal control list and outputting the list. The display unit allows the user to see objects and may include a viewfinder, a display screen, or the like.

The location information processing unit 210 recognizes a location of the user terminal 100 and recognizes locations of the objects 121, 123, and 125 having wireless communication modules by using information about the location of the user terminal 100. As described above, the location information processing unit 210 can ascertain the location of the user terminal 100 on the basis of on the GPS signal received from the GPS satellite or on the basis of the base station. In addition, the location information processing unit 210 can calculate actual location ranges of the objects 123 and 125 that come within a visual field of the viewfinder or the liquid crystal display screen of the user terminal 100, or calculate an actual location of an object focused by the user terminal 100. The location information processing unit 210 converts the location information of an object that the user terminal 100 tries to capture into information about a location of the object on an image to be displayed, by using the location information of the user terminal 100 and the location information of the objects 123 and 125 having wireless communication modules. The user terminal 100 adds the converted location information about the objects 123 and 125 to the object information and stores the object information together with image data in an image file.

The image file processing unit 220 generates the image file according to an exemplary embodiment of the present invention. The image file processing unit 220 takes a picture of an object and generates image data. When the user terminal 100 takes a picture of the object, the user terminal 100 can receive object information from the object through a network, or can receive from the object a Uniform Resource Locator (URL) which is an internet website address storing identification information about the object, a serial number of an RFID tag attached to the object, or detailed information about the object. The image file processing unit 220 stores the information received from the object in an image file, together with the image data. In some cases, the user terminal 100 may transmit the identification information, the serial number, or the URL received from the object to the object information providing server 130 that is connected with the user terminal 100 through a wired or wireless network, to thereby request detailed information about the object. The object information providing server 130 extracts the information about the object by using the identification number and so on received from the user terminal 100 and transmits the information to the user terminal 100. The image file processing unit 220 can store the object information received from the object or the object information providing server 130, together with the image data generated by taking a picture of the object. The image file processing unit 220 can receive from the location information processing unit 210 the information about of the location of the object on the image generated by using the location information of the user terminal 100 and the location information of the object, and add the received information about the location of the object on the image to the object information to store the addition result in the image file.

The communication unit 230 performs wireless communications with the objects 121, 123, and 125 that are located within a predetermined area around the user terminal 100, or performs wired or wireless communications with the object information providing server 130. The user terminal 100 can wirelessly communicate with the objects 121, 123, and 125 or the object information providing server 130 by using an RFID reader or a technology such as a WLAN, Bluetooth, Zigbee, or a Wibro. The communication unit 230 may include a Radio Frequency (RF) transmitting unit (not shown), an RF receiving unit (not shown), a baseband processing unit (not shown), and a link controlling unit (not shown). The baseband processing unit and the link controlling unit are connected to the control unit 201 by a Host Control Interface (HCI), and transmit/receive control commands and sending/receiving data by transmitting and receiving HCI packets. The baseband processing unit converts the formats of a variety of HCI data packets transmitted from the control unit 201 by adding an access code and a header to the HCI data packets, re-converts the converted packets into predetermined data packets for use in wireless transmission to transmit it to the RF transmitting unit, and converts data packets received by the RF receiving unit into HCI packets to transmit them to the control unit 201. The RF transmitting unit modulates and amplifies the data packets for wireless transmission that have been generated by the baseband processing unit to predetermined frequency bands, and transmits the data packets in the frequency bands. The user terminal 100 can request the objects 121, 123, and 125 having wireless communication modules to perform communications, by using the RF transmitting unit. The RF transmitting unit receives a signal, controls amplification of noise of the signal, amplifies the signal in the predetermined frequency band, lowers the amplified frequency band to a low frequency band, and transmits the signal in the low frequency band to the baseband processing unit. The RF receiving unit can receive location information, identification information, or object information about the objects 121, 123, and 125 having the wireless communication modules from the objects 121, 123, and 125.

Figure 3:
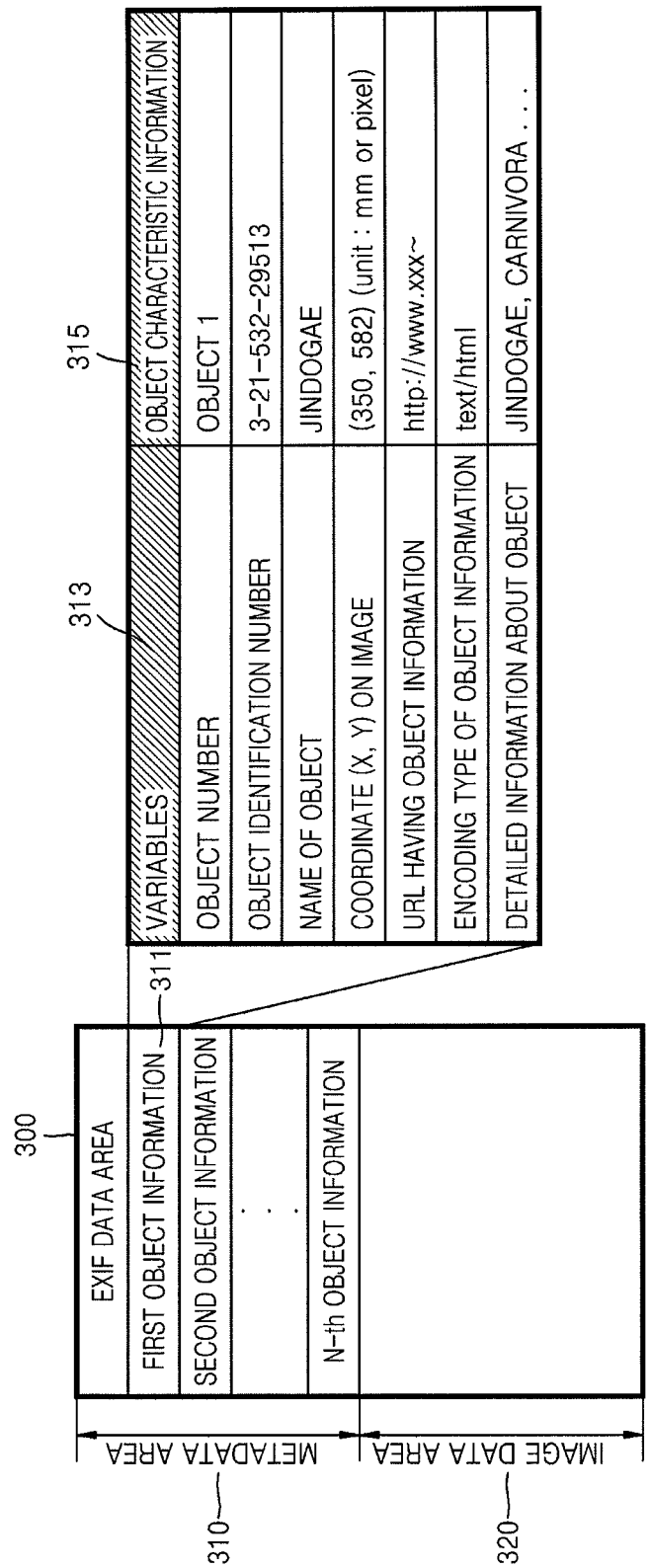
FIG. 3 is a diagram for explaining an image file according to an exemplary embodiment of the present invention.

FIG. 3 is a diagram for explaining an image file 300 according to an exemplary embodiment of the present invention. Referring to FIG. 3, the image file 300 includes an image data area 320 and a metadata area 310. Image data generated by using the user terminal 100 is recorded in the image data area 320. The metadata area 310 corresponds to an area for storing information to represent contents, such as a location of contents, a description of the context, information about a writer of the contents, and a history of the use of the contents. If the data is image data, incidental information about the image data may be recorded in an Exchangeable Image File Format (EXIF) type. In the exemplary embodiment illustrated in FIG. 3, the metadata area 310 includes not only general information about a photo file recorded in the image data area 320 but also information about objects on the image. If there are plurality of objects on the image, object information about the plurality of objects can be included in the metadata area 310. In FIG. 3, the metadata area 310 includes object information about N objects, where N is a natural number. First object information 311, which is information about object 1 and recorded in the metadata area 310, will now be described. Variables 313 and object characteristic information 315 are recorded in the first object information 311. An object number among the variables 313 identifies objects to be displayed on an image. An object identification number among the variables 313 includes serial numbers of RFID tags attached to objects, types of apparatuses including wireless communication modules, or unique numbers of the apparatuses. An object name denotes names or types of the objects to be displayed on the image. Coordinates (X, Y) on the image denote information about locations of the objects on the image into which actual locations of the user terminal 100 and objects have been converted. The image data is 2-dimensional, and thus the location information of the objects on the image can be represented as 2-dimensional coordinates. The coordinates (X, Y) on the image can be shown in units of mm or pixel. An URL indicates an address on a web site where detailed information about objects is recorded. When the user terminal 100 receives from an object an address on a website where a description on the object is recorded, the user terminal 100 may store the address in the image file without changes in the address, however the user terminal 100 may also connect to the website by using an address corresponding to the website to receive detailed information about the object and store the detailed information. An object information encoding type indicates a file format in which the object information is compressed. Detailed object information indicates detailed information about the objects. As described above, the object information may be received from the objects via wireless communications, be found from a database of the user terminal 100 by a search using the object identification number, or be received from a separate server or the like. The first object information 311 may include at least one of the above-described information pieces about the objects.

Figure 4:
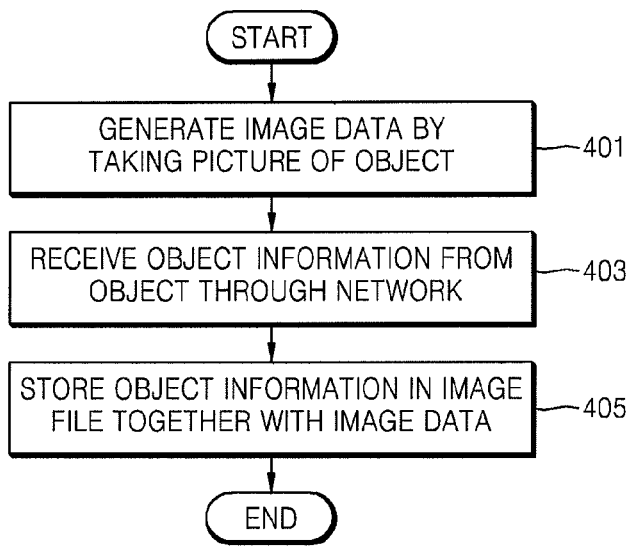
FIG. 4 is a flowchart of a method of generating an image file having object information according to an exemplary embodiment of the present invention.

FIG. 4 is a flowchart of a method of generating an image file having object information, according to an exemplary embodiment of the present invention. Referring to FIG. 4, the user terminal 100 may take a picture of an object having a wireless communication module and generate an image file (operation 401). The user terminal 100 may take pictures of a plurality of objects. The user terminal 100 may wirelessly communicate with the wireless communication module of the object, and receive object information from the object (operation 403). As described above, the object information may include unique identification numbers of objects, names of the objects, addresses on a website where detailed information about the objects are recorded, etc. The user terminal 100 stores the object information in the image file, together with the image data (operation 405). If there is a plurality of objects, the user terminal 100 may store the information about each of the objects in the image file.

Figure 5:
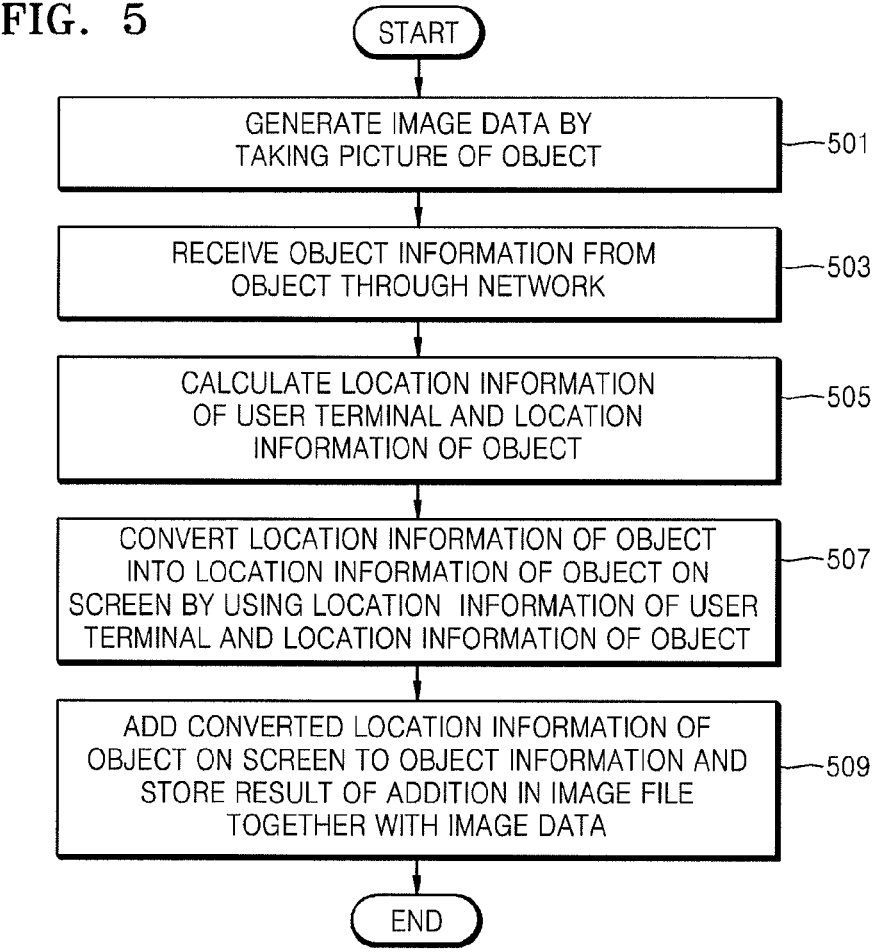
FIG. 5 is a flowchart of a method of generating an image file having object information according to another exemplary embodiment of the present invention.

FIG. 5 is a flowchart of a method of generating an image file having object information, according to another exemplary embodiment of the present invention. Referring to FIG. 5, the user terminal 100 takes a picture of an object having a wireless communication module and generates an image file (operation 501). The user terminal 100 communicates with the object by using the wireless communication module attached to the object, and receives the object information from the object (operation 503). Examples of a network between the user terminal 100 and the object include near field communications networks using a WLAN, Bluetooth, Zigbee, and a WiBro technique. If an RFID tag is attached to the object and an RFID reader is attached to the user terminal 100, the user terminal 100 may receive RFID tag information from the RFID tag and read the information to thereby obtain desired information. The user terminal 100 calculates its own location information and location information about the object (operation 505). The user terminal 100 may calculate its own location information on the basis of a GPS signal or on the basis of a wireless signal from a base station. The user terminal 100 can calculate information about an actual location of objects included in the image data by using the location information about the user terminal 100 itself. As described above, examples of a method of calculating location information of objects include a method of calculating information about the actual locations of objects by focusing on the objects. However, the present invention is not limited to this example and the user terminal 100 may receive the location information about the objects directly from the objects, or obtain the location information about the objects from other apparatuses. The location information about the user terminal 100 and the location information about the objects may include a latitude, a longitude, a direction of a view field, and an altitude. The user terminal 100 converts the actual location information about the objects into information about locations of the objects on a screen by using the location information about the user terminal 100 and the location information about the objects (operation 507). The user terminal 100 may convert the actual locations of the objects into locations of the objects on a viewfinder or a liquid crystal display screen by using location information about objects that are located within a visual field of the viewfinder or liquid crystal display screen, the location information about the user terminal 100 itself, the visual field of the user terminal 100, and the size of the viewfinder or liquid crystal display screen. The user terminal 100 adds the converted information about the locations of the objects on the screen to the object information, and stores the result of the addition in the image file together with the image data (operation 509). The user terminal 100 can generate an object information identifier which indicates that the information about the objects on an image can be output to the converted location on the viewfinder or liquid crystal display screen, add the identifier and the converted location information to the object information, and store the result of the addition in an image file. When a user views the image, the object information identifier indicates that the information about objects can be displayed on the converted locations of the objects on the viewfinder or liquid crystal display screen. The object information identification may be names of the objects, unique numbers for the objects, blinking dots, or emoticons.

Figure 6:
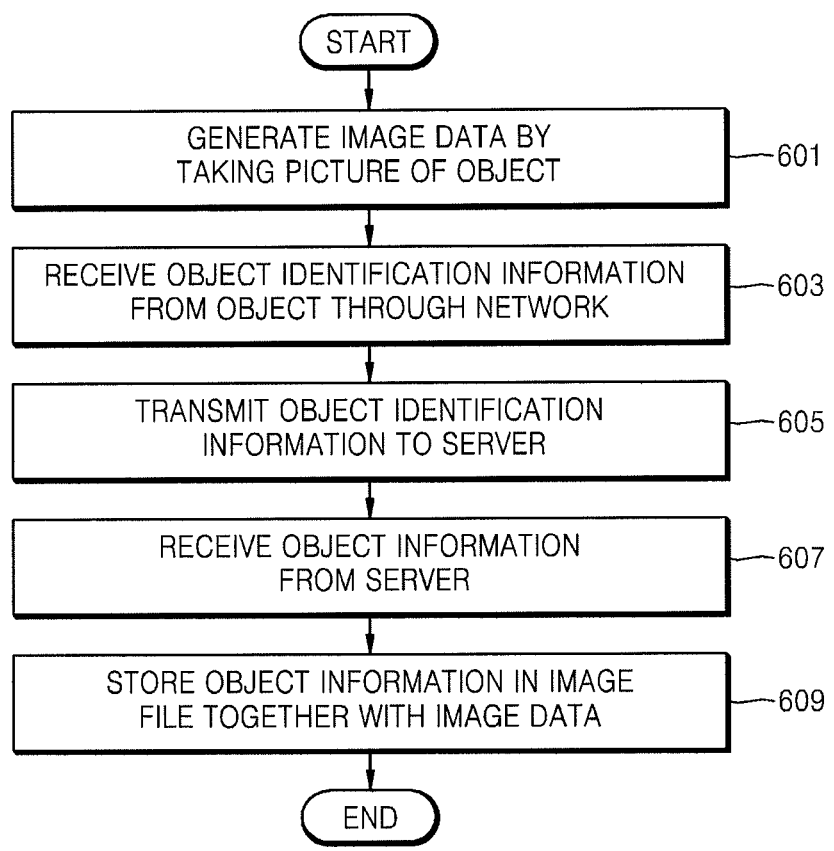
FIG. 6 is a flowchart of a method of generating an image file having object information according to another exemplary embodiment of the present invention.

FIG. 6 is a flowchart of a method of generating an image file having object information, according to another exemplary embodiment of the present invention. Referring to FIG. 6, the user terminal 100 takes a picture of an object and generates image data (operation 601). The user terminal 100 receives object identification information from the object through communications with the object (operation 603). If an RFID tag is attached to the object, the object identification information may be a unique serial number of the RFID tag, or if a wireless communication module such as a Bluetooth is attached to the object, the object identification information may be a unique number of the module or a type of the module. The user terminal 100 may store the object identification information received from the object together with image data in the image file. The user terminal 100 may request for an object information search by transmitting the object identification information received from the object to the object information providing server 130 that is connected to the user terminal 100 through a wired or wireless network (operation 605). The object information providing server 130 extracts object information using the object identification information received from the user terminal 100 and transmits the object information to the user terminal 100. If database is included in the user terminal 100, the user terminal 100 may obtain information about the object or information related to the object by searching for the object information in the database. The user terminal 100 stores (operation 609) in the image file the object information that has been received from the object information providing server 130 (operation 607), or extracted from the database, together with the image data.

Figure 7:
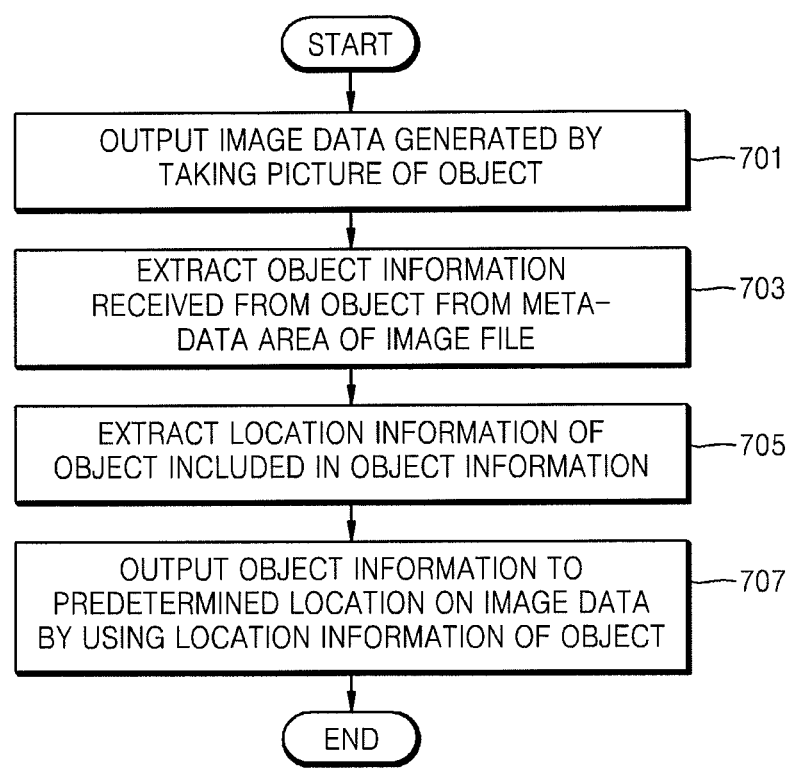
FIG. 7 is a flowchart of a method of outputting an image file, according to an exemplary embodiment of the present invention.

FIG. 7 is a flowchart of a method of outputting an image file, according to an exemplary embodiment of the present invention. Referring to FIG. 7, a user may output the image file 300 generated according to the above-described methods, through the user terminal 100 which has generated the image file 300 or through a device (hereinafter, referred to as an output device) for outputting the image file 300, such as a Personal Computer (PC) or a laptop. The output device outputs an image by using the image data stored in the image data area 320 of the image file 300 (operation 701). The output device extracts object information from the metadata area 310 of the image file 300 (operation 703). As described above, the object information can be received from an object through a network and stored in the metadata area 310. If information indicating a location of the object on the image is included in the object information, the output device extracts the object information (operation 705). The output device outputs the object information to the location of the object on the image by using the extracted object location information (operation 707).

If the user terminal 100 generates an identifier which indicates that information about the object exists on a calculated location on a viewfinder or a liquid crystal display screen and stores the identifier in the image file 300, the output device may display the identifier which indicates that the information about the object can be output to the location of the object on the image. If the user selects the identifier, the output device may output detailed object information about the object selected by the user.

Figure 8:
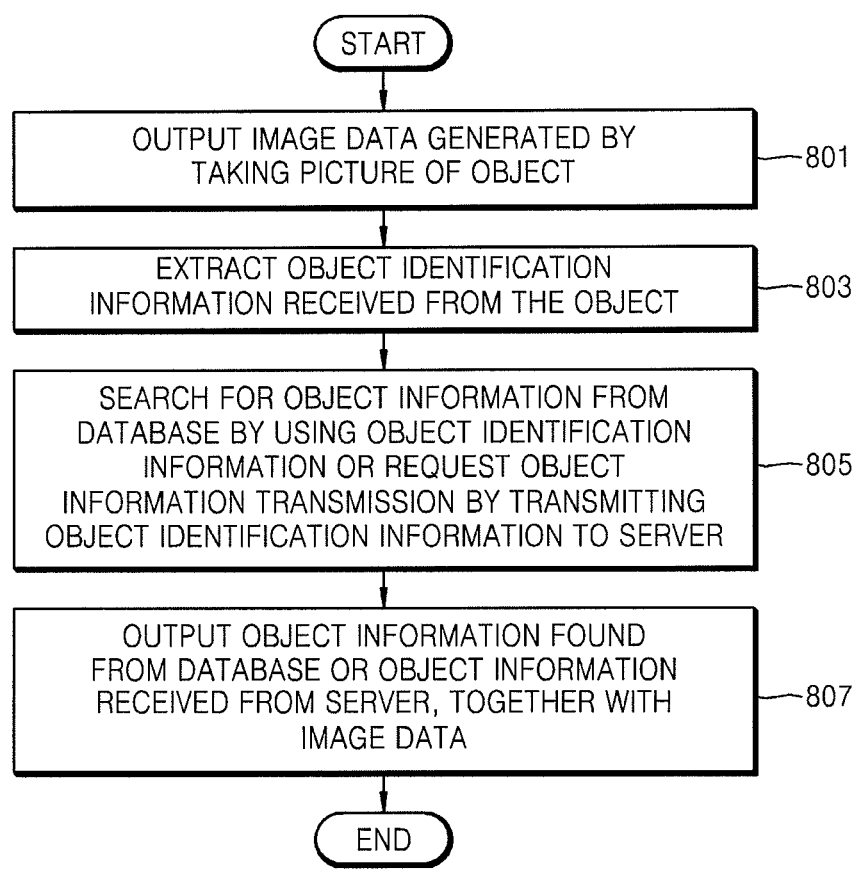
FIG. 8 is a flowchart of a method of outputting an image file, according to another exemplary embodiment of the present invention.

FIG. 8 is a flowchart of a method of outputting an image file, according to another exemplary embodiment of the present invention. Referring to FIG. 8, the output device outputs image data generated by taking a picture of an object (operation 801). If object identification information received from the object is stored in an image file, the output device extracts the object identification information from the image file (operation 803). The object identification information may include an URL, a unique identification number of the object, etc. The output device searches for object information from the database included in the output device by using the object identification information, or request for a transmission of the object information by transmitting the object identification information to a server (operation 805). The output device outputs the object information found from the database or the object information received from the server together with image data or to a separate screen (operation 807). The output device may extract location information of the object from the image file and output the object information to a specific location on the image by using the extracted location information.

Figure 9:
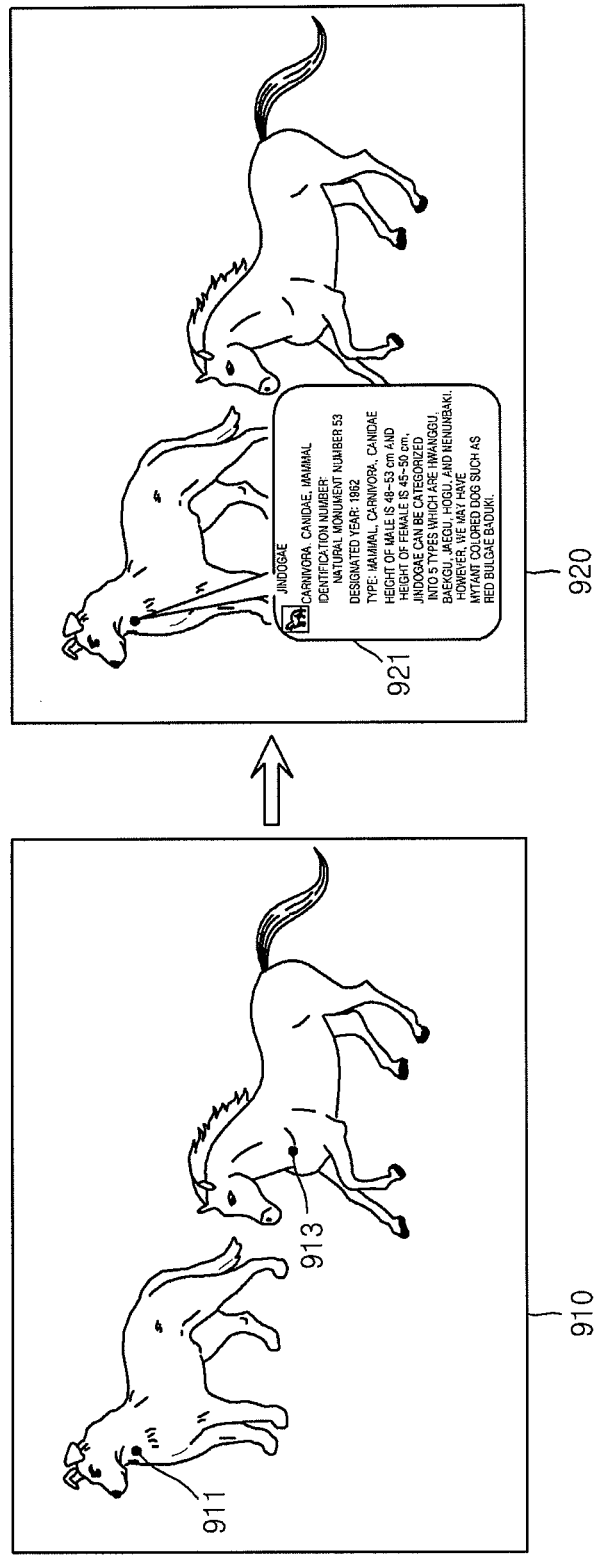
FIG. 9 illustrates output display screens, according to an exemplary embodiment of the present invention.

FIG. 9 illustrates output screens according to an exemplary embodiment of the present invention. A user can reproduce an image file by using an output device. When the user reproduces the image file generated according to the above-described methods, an output unit (now shown) included in the output device outputs image data included in the image data area 320. If the user wants to know about the object information about objects on an image, the user may select an object information view for objects by controlling the output device. In this case, the output device can output screens 910 and 920 where information about the objects is displayed, under the control of the user. The screen 910 includes object information identifiers 911 and 913 which indicate that object information about the objects can be displayed on specific locations of the objects on the image. The user can select the object information identifiers 911 and 913 in order to see the object information about the objects. When the user selects the object information identifier 911, the output device can extract the object information about the object selected by the user from the metadata area 310 and output the object information. If detailed information about the object is not recorded in the object information but only an object identification number or an URL having information about the object is recorded, the output device may search for detailed information about the object from a database (not shown) included in the output device by using the pre-stored object identification number or URL or search for the detailed information about the object by connecting to the object information providing server 130 through a network, to thereby output the object information. The output device may display the extracted object information 921 as in the screen 920.

According to exemplary embodiments of the present invention, when a photographing apparatus capable of perform wireless communications generates image data by taking a picture of an object having a wireless communication module, object information is received from the object through wireless communications and is stored together with image data.

When a camera generates image data by taking a picture of an object, a location of the object is converted into a location on an image by using location information about the camera and object, and information indicating the converted location on the image is stored in the image file.

In addition, according to exemplary embodiments of the present invention, image data generated by taking a picture of an object can be output together with information about the object.

When the image data is output, the information about the object can be also output to the location of the object on the image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating an image file including object information about an object, the method performed in a user terminal and comprising:
   generating image data by taking a picture of the object;
   receiving the object information from the object through a network;
   storing the object information in the image file with the image data;
   converting location information of the object into location information of the object on a screen by using location information of the user terminal and the location information of the object; and
   performing an addition of the converted location information of the object on the screen to the object information and storing a result of the addition in the image file,
   wherein the location information of the object on the screen comprises information indicating a portion of the screen in which the object appears, and
   wherein the location information of the user terminal includes one from among a first latitude, a first longitude, a first direction of a visual field and a first altitude.

2. The method of claim 1, wherein the object includes a Radio Frequency Identification (RFID) tag which includes the object information, and the user terminal includes an RFID reader,
   wherein the receiving of the object information comprises receiving the object information included in the RFID tag using a radio frequency.

3. The method of claim 1, wherein the network is a short-distance wireless network using one of a Wireless Local Area Network (WLAN) method, a Bluetooth method, a Zigbee method and a Wireless Broadband (WiBro) method.

4. The method of claim 1, further comprising calculating the location information of the user terminal, wherein the calculating of the location information of the user terminal comprises:
   receiving a Global Positioning System (GPS) signal from a satellite; and
   calculating the location information of the user terminal by using the received GPS signal.

5. The method of claim 1, further comprising calculating the location information of the user terminal, wherein the calculating of the location information of the user terminal comprises:
   receiving a wireless signal from a base station; and
   calculating the location information of the user terminal by using the wireless signal.

6. The method of claim 1, wherein the location information of the user terminal includes a first latitude, a first longitude, a first direction of a visual field and a first altitude and the location information of the object includes a second latitude, a second longitude, a second direction of a visual field and a second altitude.

7. The method according to claim 1, wherein the information indicating the portion of the screen in which the object appears further comprises coordinates indicating the location of the object on the screen.

8. The method according to claim 1, wherein the location information of the object includes at least one from among a second latitude, a second longitude, a second direction of a visual field and a second altitude.

9. A method of generating an image file including object information about an object, the method performed in a user terminal and comprising:
   generating image data by taking a picture of the object;
   receiving object identification information from the object through a network;
   receiving location information of the object from the object through the network;
   converting the location information of the object into location information of the object on a screen by using location information of the user terminal and the location information of the object;
   performing an addition of the converted location information of the object on the screen to the object identification information; and
   storing the result of the addition in the image file with the image data,
   wherein the location information of the object on the screen comprises information indicating a portion of the screen in which the object appears, and
   wherein the location information of the user terminal includes one from among a first latitude, a first longitude, a first direction of a visual field and a first altitude.

10. The method of claim 9, wherein the user terminal is connected to an object information storage server through the network, or through another network, and the method further comprises:
    transmitting the object identification information to the object information storage server;
    receiving the object information about the object from the object information storage server; and
    storing the received object information in the image file with the image data.

11. The method of claim 10, wherein the object includes a Radio Frequency Identification (RFID) tag which includes the object information, and the user terminal includes an RFID reader,
    wherein the receiving of the object identification information comprises receiving the object identification information included in the RFID tag using a radio frequency.

12. The method according to claim 9, wherein the information indicating the portion of the screen in which the object appears further comprises coordinates indicating the location of the object on the screen.

13. The method according to claim 9, wherein the location information of the object includes at least one from among a second latitude, a second longitude, a second direction of a visual field and a second altitude.

14. A method of outputting an image file, the method performed in a user terminal and comprising:
    extracting image data generated by taking a picture of the object from the image file and outputting the image data; and
    outputting object information about the object,
    wherein the object information is received from the object and is recorded in the image file;
    wherein the outputting of the object information comprises outputting the object information from a metadata area of the image file; and
    wherein the outputting of the object information comprises outputting the object information to a location of the object on an image by using location information of the object that is stored in the image file,
    wherein the outputting the object information further comprises determining information indicating a portion of the image in which the object appears.

15. The method of claim 14, wherein the outputting of the object information comprises:

extracting image data generated by taking a picture of the object from the image file and outputting the image data;

extracting object identification information received from the object from the image file;

searching for the object information from database by using the object identification information; and outputting the object information extracted from the database.

16. The method of claim 14, wherein the user terminal is connected to an object information storage server through a network, wherein the outputting of the object information comprises:

outputting image data generated by taking a picture of the object;

extracting object identification information received from the object;

transmitting the object identification information to the object information storage server;

receiving the object information from the server; and outputting the object information.

17. The method of claim 16, wherein the object identification information comprises one of a Uniform Resource Locator (URL) and an identification number of the object.

18. The method according to claim 14, wherein the information indicating the portion of the image in which the object appears further comprises coordinates indicating the location of the object in the image.

19. The method according to claim 14, wherein the location information of the object includes at least one from among a second latitude, a second longitude, a second direction of a visual field and a second altitude.

20. An apparatus for generating an image file including object information about an object, the apparatus comprising:

an image file processing unit which generates image data by taking a picture of the object, and stores information received from the object with the image data to generate the image file;

a communication unit which receives the information from the object through a network;

a location information processing unit which calculates location information of the apparatus and converts location information of the object into location information of the object on a screen by using the location information of the apparatus and the location information of the object, wherein the location information of the object on the screen comprises information indicating a portion of the screen in which the object appears, and wherein the location information of the apparatus includes one from among a first latitude, a first longitude, a first direction of a visual field and a first altitude.

21. The apparatus of claim 20, wherein the image processing unit comprises:

an image data generating unit which generates the image data by taking a picture of the object;

an object information processing unit which processes the information received from the object; and an image file generating unit which generates the image file by storing the object information with the image data.

22. The apparatus of claim 21, wherein the object includes a Radio Frequency Identification (RFID) tag which includes the object information, and the apparatus includes an RFID reader, wherein the communication unit receives the object information included in the RFID tag by using a radio frequency.

23. The apparatus of claim 21, wherein the converted location information of the object on the screen is added to the object information in an addition and a result of the addition is stored in the image file.

24. The apparatus of claim 20, wherein the apparatus is connected to an object information storage server through a network, wherein if the information received from the object is object identification information, the communication unit transmits the object identification information to the object information storage server, receives the object information about the object from the object information storage server, and transmits the received object information to the image file processing unit.

25. The apparatus according to claim 20, wherein the information indicating the portion of the screen in which the object appears further comprises coordinates indicating the location of the object on the screen.

26. The apparatus according to claim 20, wherein the location information of the object includes at least one from among a second latitude, a second longitude, a second direction of a visual field and a second altitude.

27. An apparatus for outputting an image file having object information of an object, the apparatus comprising:

a processor which extracts image data generated by taking a picture of the object from the image file and outputs the image data and object information about the object, wherein the object information comprises a location of the object on the image converted from location information of a user terminal and location information of the object, wherein the object information further comprises information indicating a portion of the image in which the object appears, and wherein the location information of the user terminal includes one from among a first latitude, a first longitude, a first direction of a visual field and a first altitude.

28. The apparatus of claim 27, wherein the object information is extracted from a metadata area of the image file.

29. The apparatus of claim 27, wherein the apparatus extracts object identification information received from the object from the image file, searches for the object information from database by using the object identification information, and outputs the object information extracted from the database.

30. The apparatus of claim 27, wherein the apparatus is connected to an object information storage server through a network, and the apparatus extracts object identification information received from the object, transmits the object identification information to the object information storage server, receives the object information from the server, and outputs the object information.

31. The apparatus according to claim 27, wherein the information indicating the portion of the image in which the object appears further comprises coordinates indicating the location of the object in the image.

32. The apparatus according to claim 27, wherein the location information of the object includes at least one from among a second latitude, a second longitude, a second direction of a visual field and a second altitude.

* * * * *